United States Patent [19]

Stifter

[11] 4,368,499
[45] Jan. 11, 1983

[54] ELECTRICAL EQUIPMENT PROTECTION APPARATUS

[75] Inventor: Francis J. Stifter, Natick, Mass.

[73] Assignee: Electronic Specialists, Inc., Natick, Mass.

[21] Appl. No.: 239,391

[22] Filed: Mar. 2, 1981

[51] Int. Cl.³ .......................... H02H 3/20; H02H 3/24
[52] U.S. Cl. ........................................ 361/90; 361/89; 340/662; 340/663
[58] Field of Search ................. 361/90, 89, 91, 92, 361/88, 196, 115, 198; 340/660, 661, 662, 663; 307/350, 351

[56] References Cited

U.S. PATENT DOCUMENTS

| | | | |
|---|---|---|---|
| 3,535,591 | 10/1970 | Holmquest | 361/90 X |
| 3,657,603 | 4/1972 | Adams | 361/90 X |
| 3,663,958 | 5/1972 | Crane | 361/90 X |

Primary Examiner—Patrick R. Salce

[57] ABSTRACT

A circuit apparatus including a circuit interrupter connected between an AC supply and electrical equipment to be protected and operational in a first condition to transmit power therebetween and operational in a second condition to interrupt power transmission therebetween, a control circuit for producing the first condition in response to normal supply voltage and for producing said second condition in response to abnormal supply voltage, a delay circuit connected to the control circuit and adapted to produce a minimum time delay between successive occurrences of the first condition, an overvoltage circuit adapted to produce the second condition in response to a voltage from the supply that exceeds a predetermined maximum level, and an undervoltage circuit adapted to produce the second condition in response to a voltage from the supply that is below a given threshold level.

11 Claims, 2 Drawing Figures

ELECTRICAL EQUIPMENT PROTECTION APPARATUS

BACKGROUND OF THE INVENTION

This invention relates generally to a power line interrupter for electrical equipment and, more particularly, to a power line interrupter that automatically restores power only after a predetermined time delay.

Erratic supply voltage poses a serious problem for various types of electrical equipment. Excessive supply voltage fluctuations often cause damage such as component burnout or breakdown. In addition to commonly experienced peak voltage swings on commercial AC supply lines, inadvertent power failures contribute to this problem. The resumption of electrical service after a power failure often is accompanied by large voltage fluctuations that can damage equipment. Although circuits have been developed for protecting electrical equipment from abnormal voltages or for delaying the reapplication of power after power failures, none has fully satisfied all of the problems incident thereto.

The object of this invention, therefore, is to provide an improved, relatively low cost apparatus that will protect electrical equipment from damage normally associated with excessive supply voltage fluctuations produced spontaneously or after inadvertent power failures.

SUMMARY OF THE INVENTION

The invention is a circuit apparatus including a circuit interrupter connected between an AC supply and electrical equipment to be protected and operational in a first condition to transmit power therebetween and operational in a second condition to interrupt power transmission therebetween, a control circuit for producing the first condition in response to normal supply voltage and for producing said second condition in response to abnormal supply voltage, a delay circuit connected to the control circuit and adapted to produce a minimum time delay between successive occurrences of the first condition, an overvoltage circuit adapted to produce the second condition in response to a voltage from the supply that exceeds a predetermined maximum level, and an undervoltage circuit adapted to produce the second condition in response to a voltage from the supply that is below a given threshold level. The overvoltage and undervoltage circuits interrupt power transmission in response to excessive fluctuations in supply voltage while the delay circuit protects the equipment from the potentially dangerous transient voltage fluctuations that typically accompany a resumption of electrical service after an inadvertent power failure.

In a preferred embodiment of the invention, the circuit interrupter comprises a relay having power contacts for connection between the supply and the equipment to be protected and a relay winding energized to close the power contacts during the first condition and de-energized to open the power contacts during the second condition. Energizing current for the relay winding is provided by an electronic switch in the control circuit that requires a control signal from an activation circuit to produce the first condition. The control signal is eliminated by either the overvoltage circuit in response to an input voltage above the predetermined maximum level of by the undervoltage circuit in response to an input voltage below the given threshold level. In this way, the connected equipment is protected from either excessive overvoltages or excessive undervoltages. Furthermore, power interruption to the protected equipment is achieved by electronically de-energizing the relay winding to assure quick opening of the relay contacts.

According to an important feature of the invention, the relay includes auxiliary contacts that connect the delay circuit to the AC supply during the second condition and disconnect the delay circuit therefrom during the first condition. After connection to the AC supply for the minimum time delay period, an activator electronic switch in the delay circuit is triggered to produce an activator signal which induces energization of the relay winding to thereby close the power contacts and open the auxiliary contacts.

Additional features of the invention include an override circuit manually operable to defeat the delay circuit and thereby eliminate the minimum time delay before reconnection after a power outage, and adjustable resistances for selectively changing either the threshold level of the undervoltage circuit or the maximum level of the overvoltage circuit. These features provide the invention with greater operational flexibility.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENT

Figure 1:
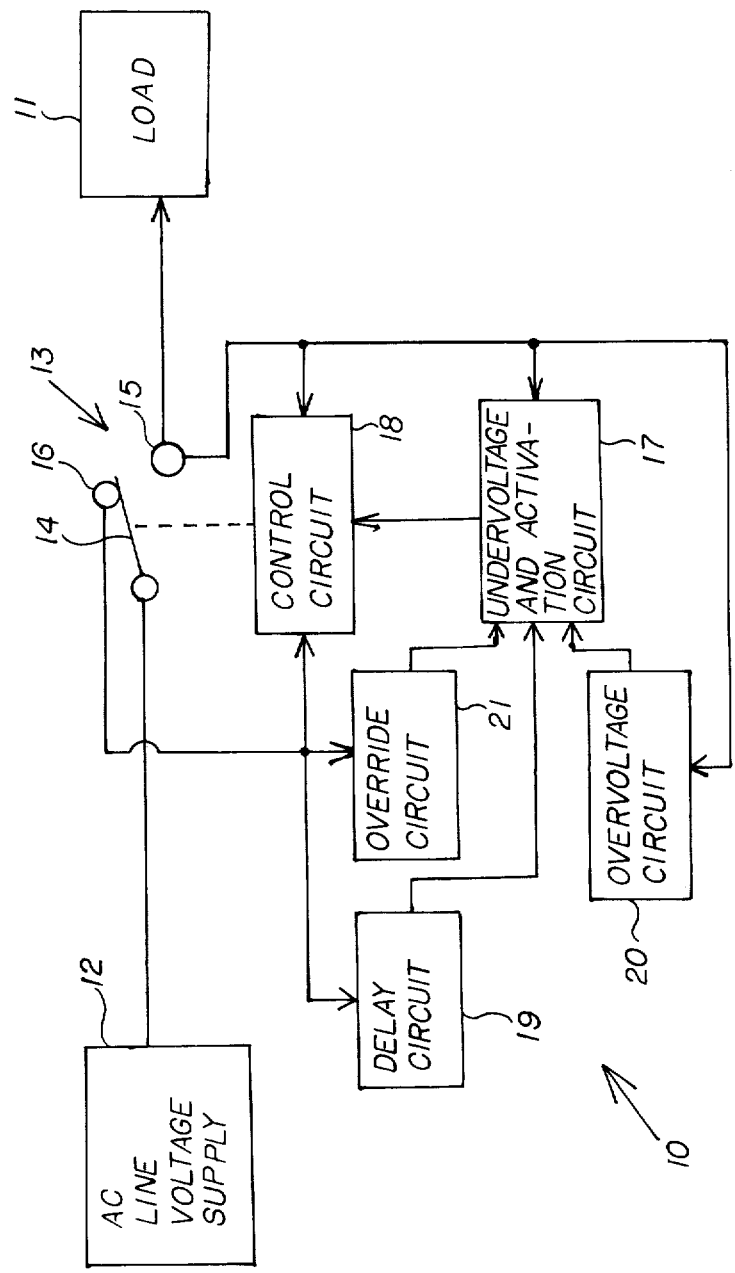
FIG. 1 is a schematic block diagram illustrating a preferred embodiment of the invention.

Illustrated in FIG. 1 is a circuit apparatus 10 for protecting electrical equipment 11 supplied from an AC power line 12. Connecting the load 11 to the supply 12 is an interrupter 13 including a switch blade 14 that moves between a power contact 15 and an auxiliary contact 16. The power contact 15 is connected to an overvoltage circuit 16, an undervoltage and activator circuit 17 and a control circuit 18 that establishes the operating position of the switch blade 14. Connected to the auxiliary contact 16 are a delay circuit 19, an override circuit 21 and the control circuit 18.

During operation of the apparatus 10, power from the supply 12 is first applied to the delay circuit 19 which after a predetermined time delay provides an activating signal. In response to that signal, the activating circuit 17 activates the control circuit 18 which moves the switch blade 14 to open the auxiliary contact 16 and close the power contact 15. This allows the transmission of power to the load 11 and applies line voltage to the over-voltage circuit 16, the activator and undervoltage circuit 17 and the control circuit 18 while removing line voltage from the delay circuit 19 and the override circuit 21. If operation of the interrupter 13 is desired without the delay provided by the delay circuit 19, the override circuit 21 can be manually operated to provide directly an activating signal to the activating circuit 17. In the event that the supply voltage exceeds a predetermined maximum level, the overvoltage circuit 16 responds by deactivating the circuit 17 which causes the control circuit 18 to open the power contact 15 and interrupt power flow to the load 11. A resumption in the transmission of power requires reactivation of the activator circuit 17 by the delay circuit 19 after the minimum time delay. In response to either a power failure at the supply 12 or a reduction in supply voltage to below a given threshold level, the undervoltage circuit 17 similarly responds by deactivating the control circuit 18 to open the power contact 15 and close the auxiliary contact 16. Again, power transmission can be resumed only after the minimum time delay provided by the delay circuit 19.

Figure 2:
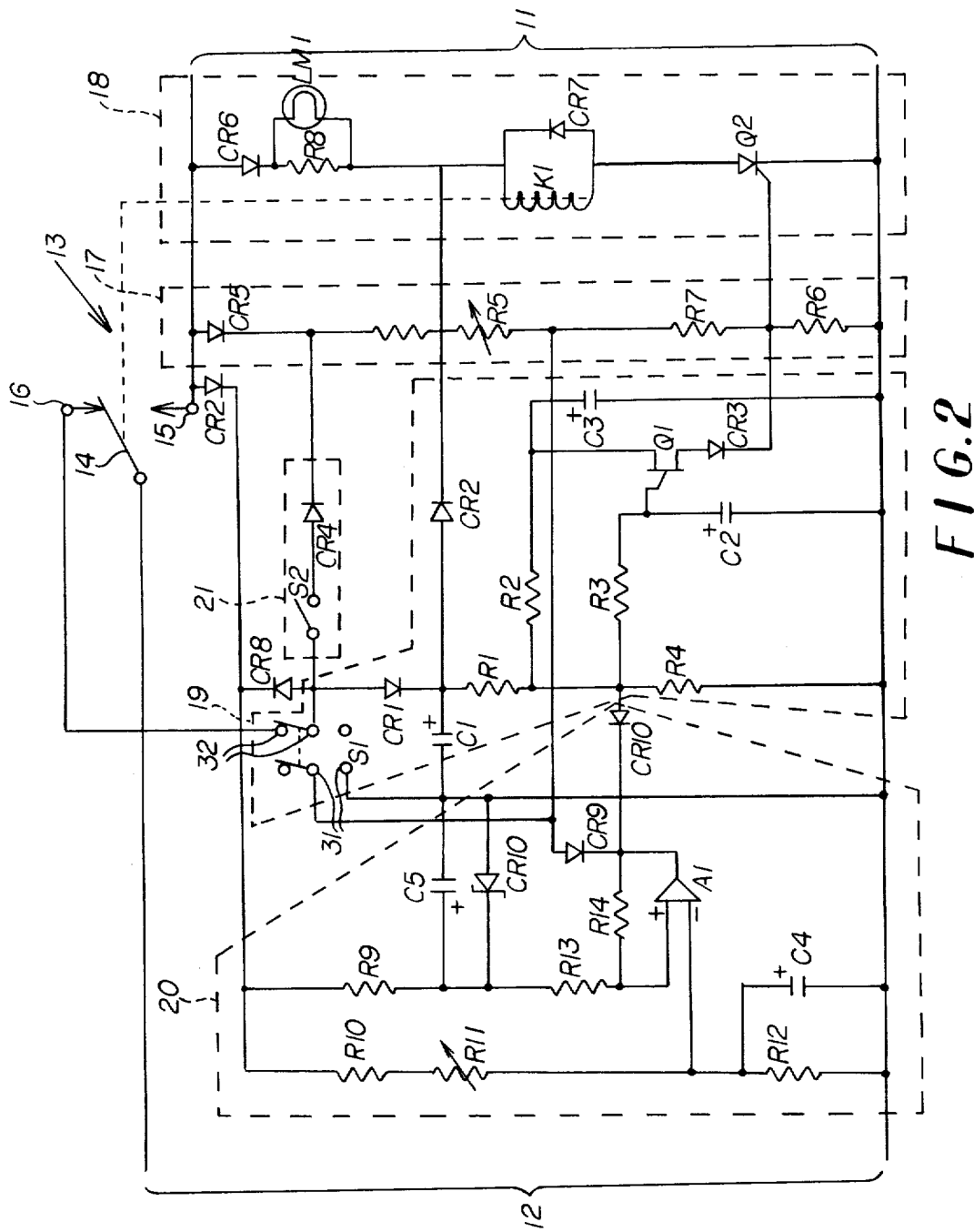
FIG. 2 is a detailed schematic circuit diagram of the invention shown in FIG. 1.

Referring now to FIG. 2, the delay circuit 19 includes a unijunction transistor Q1, a toggle switch S1, diodes CR1-CR3, capacitors C1-C3 and resistors R1-R3. Included in the override circuit 21 is a switch S2 and a diode CR4 while the undervoltage and activating circuit 17 includes a diode CR5 and resistors R5-R7 of which R5 is adjustable. The control circuit 18 includes an SCR Q2, a diode CR6, a parallel combination of a resistor R8 and an indicator lamp LM1 and the parallel combination of a diode CR7 and a relay winding K1 that controls the switch blade 14. Finally, the over-voltage circuit 16 includes diodes CR8-CR11, an operational amplifier A1, capacitors C4, C5 and resistors R9-R14 of which resistor R11 is adjustable.

OPERATION OF FIG. 2

Assume that power is initially applied from the supply 12 with the switches 13 and S1 in the positions shown. The capacitor C1 is charged through the diode CR1 and the SCR Q2 is inoperative. Anode voltage for the transistor Q1 is supplied by the capacitor C3 which rapidly charges through the resistor R2. The resistors R1 and R4 are selected to establish a safe operating level for the transistor Q1. After a predetermined time delay established by a relatively long time constant of the resistor R3 and the capacitor C2, the capacitor C2 reaches a level that fires the transistor Q1. This triggers the SCR Q2, pulling current from the capacitor C1 through the diode CR2 and the relay winding K1. The resultant energization of the winding K1 moves the switch blade 14 into contact with the power contact 15 establishing a first condition in which power is transmitted between the supply 12 and the load 11.

After opening of the auxiliary contact 16, power is removed from the delay circuit 19. Conversely, closure of the power contact 15 maintains power to the activation circuit 17 through the diode CR5 and supplies energizing current to the relay winding K1 and the SCR Q2 through the diode CR6, the resistor R8 and the lamp LM1. The SCR Q2 is triggered each positive half cycle through the diode CR5 and the divider network R5-R7. Adjustment of the resistor R5 varies the firing angle of the SCR Q2 and thereby the dropout voltage for the relay winding K1.

In response to either a power failure of the supply 12 or a reduction in line voltage to below the threshold level established by the adjustable resistor R5, the SCR Q2 is deactivated. This interrupts current flow through and de-energizes the relay winding K1 to produce the second operating condition in which the power contact 15 is opened and the auxiliary contact 16 is closed. Opening of the power contact 15, of course, interrupts power transmission to the load 11. A resumption in power flow to the load 11 after either line power is restored or line voltage rises to above the minimum threshold level requires operation of the delay circuit 19 as described above.

An interruption of power to the load 11 also can be provided manually by operation of the toggle switch S1 to produce the second operating condition. When toggled to an off position, the contacts 31 are closed to short the gate of the SCR Q2 thereby de-energizing the relay winding K1 and opening the power contact 15. The off position of the switch S1 also opens the contacts 32 to remove power from the delay circuit 19 and thereby prevent reactivation of the circuit 17. A subsequent toggling of the switch S1 to a delay-operate position shown in FIG. 2 opens the contacts 31 and closes the contacts 32 to reapply power to the delay circuit 17. In response thereto, the delay circuit 17 responds after the predetermined time delay as described above to induce energization of the relay winding K1 and closure of the power contact 15. In the event that an instantaneous application of power is desired at the load 11, the delay circuit 17 can be defeated by manual operation of the switch S2 to apply power directly to the activator circuit 17.

The operational amplifier A1 in the overvoltage circuit 16 is biased to deliver a positive output voltage for all line voltages below a predetermined maximum level that is preselected by adjustment of the potentiometer R11. When line voltage exceeds the predetermined maximum level, the operational amplifier A1 output goes low. The low output bypasses firing voltage for the SCR Q2 through the diode CR9. Consequently, the SCR Q2 ceases conduction to de-energize the relay winding K1 and open the power contact 15 and interrupt power to the load 11. After release of the switch blade 14, the closed auxiliary contact 16 again supplies power to the delay circuit 19. However, the delay transistor Q1 is prevented from firing because of a bypass of the timing circuit voltage by the diode CR10 through the operational amplifier A1. The resistors R13 and R14 provide hysteresis to eliminate erratic operation if the AC line voltage should coincide with the predetermined maximum level.

Upon a restoration of normal line voltage, the amplifier A1 returns to a positive output voltage, thereby removing the bypass to the timing delay circuit 19. Therefore, after the above-described minimum delay period required for charging of the capacitor C2, the transistor Q1 will initiate conduction of the SCR Q2 to energize the winding K1 and restore power transmission to the load 11.

Obviously, many modifications and variations of the present invention are possible in light of the above teachings. It is to be understood, therefore, that the invention can be practiced otherwise than as specifically described.

What is claimed is:
1. Electrical equipment protection apparatus comprising:
   circuit interrupter means for connection between an AC supply and equipment to be protected and operational in a first condition to transmit power therebetween and operational in a second condition to interrupt power transmission therebetween;
   control circuit means for producing said first condition in response to normal voltage from the AC supply and for producing said second condition in response to an abnormal voltage therefrom;
   delay circuit means connected to said control circuit means and adapted to produce a minimum time delay between successive occurrences of said first condition;

overvoltage means connected to said control circuit means and adapted to produce said second condition in response to an input voltage from the AC supply that exceeds a predetermined maximum level; and coupling circuit means for connecting said delay circuit means to the AC supply during said second condition and for electrically isolating said delay circuit means from the AC supply during said first condition.

2. Apparatus according to claim 1 including undervoltage means connected to said control circuit and adapted to produce said second condition in response to an input voltage from the AC supply that is below a given threshold level.

3. Apparatus according to claim 2 wherein said control circuit means comprises activator means for generating a signal that produces said first condition, said overvoltage means eliminates said signal in response to an input voltage above said maximum level, and said undervoltage means eliminates said signal in response to an input voltage below said given threshold level.

4. Apparatus according to claim 3 wherein said circuit interrupter means comprises a relay having power contacts for connection between the AC supply and the equipment to be protected and a relay winding energized to close said power contacts during said first condition and deenergized to open said power contacts during said second condition.

5. Apparatus according to claim 4 wherein said control circuit comprises an energizing electronic switch for providing energizing current flow through said relay winding and activated by said signal.

6. Apparatus according to claim 5 wherein said delay circuit means comprises an RC circuit for producing said minimum time delay after connection to the AC supply, and an activator electronic switch for producing said signal after said time delay.

7. Apparatus according to claim 6 wherein said relay further comprises auxiliary contacts for connecting said delay circuit means to the AC supply during said second condition and for disconnecting said delay circuit means from the AC supply during said first condition.

8. Apparatus according to claim 7 including override means manually operable to produce successive occurrences of said first condition in substantially less than said minimum time delay.

9. Apparatus according to claim 8 wherein said override means is manually operable to produce said signal.

10. Apparatus according to claim 9 wherein said undervoltage means comprises adjustable resistance means for selectively changing said threshold level.

11. Apparatus according to claim 9 wherein said overvoltage means comprises adjustable resistance means for selectively changing said maximum level.

* * * * *